Aug. 30, 1949.  A. A. HAMER  2,480,363
HEATING APPARATUS
Filed March 21, 1947
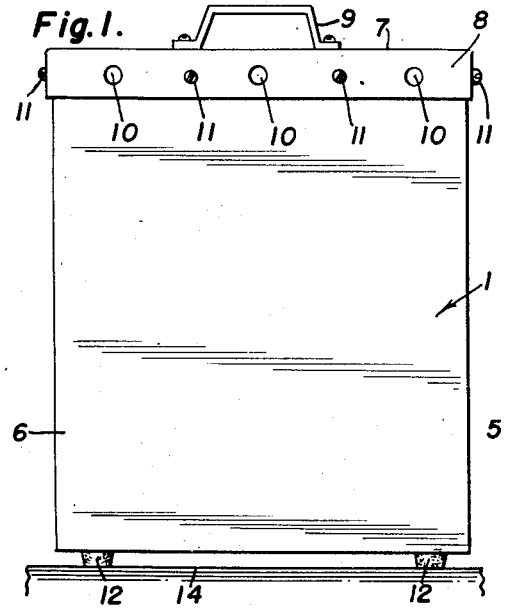
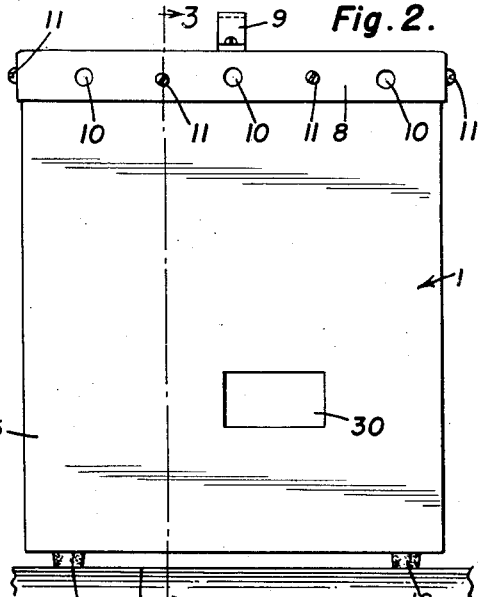
Fig. 1.
Fig. 2.
Fig. 3.
Fig. 4.
Inventor
Alfred A. Hamer
By Clarence A. O'Brien
and Harvey B. Jacobson
Attorneys Patented Aug. 30, 1949

2,480,363

UNITED STATES PATENT OFFICE 2,480,363

HEATING APPARATUS

Alfred A. Hamer, Alexandria, Va.

Application March 21, 1947, Serial No. 736,153

6 Claims. (Cl. 219—39)

This invention relates to improvements in heating apparatus.

An object of the invention is to provide an improved portable heating apparatus which will combine the use of infra-red bulbs and a fan blower for heating air and discharging the same to be used for any heating purpose.

Another object of the invention is to provide an improved portable electrically operated air heater including a casing in which one or more infra-red bulbs are disposed and an associated fan blower for drawing unheated air into the casing to be heated by the heat from the infra-red bulbs, after which the heated air will be discharged from the casing into a room or other space which will be heated thereby.

A further object of the invention is to provide an improved form of portable electrically operated air heater including a casing having a transversely extending dividing partition or metal or infra-red absorbing and transmitting glass separating said casing into an upper compartment in which a plurality of infra-red lamps of bulb or tubular form will be disposed, and a lower compartment in which either a Sirrocco type or propeller type electric motor operated fan will be disposed, whereby unheated air will be drawn into the upper compartment of the casing for heating and purifying the same, after which it will be discharged by said fan to a heated air outlet opening in the lower portion of the casing for heating any desired space or room.

Another object of the invention is to provide an improved infra-red lamp bulb type air heater with an electric motor operated fan blower for discharging the air heated by the infra-red lamp bulb or bulbs, said air heater being highly efficient in operation and relatively inexpensive to operate, manufacture and produce.

Other objects will appear as the description proceeds.

In the accompanying drawings which form a part of this application,

Figure 1 is a side elevation of the improved heating apparatus;

Figure 2 is a front elevation of the improved heating apparatus;

Figure 3 is a sectional view taken on the line 3—3 of Figure 2, and

Figure 4 is a sectional view taken on the line 4—4 of Figure 3.

Like characters of reference are used throughout the following specification and the accompanying drawings to designate corresponding parts.

In carrying out the invention, there is provided an improved air heating apparatus comprising a substantially square or rectangular shaped casing or housing generally designated by the reference numeral 1 having a bottom 2, four side walls 3, 4, 5 and 6, and a removable cover or closure member 7 having a depending peripheral locking flange 8 formed thereabout.

The cover 7 is provided with a handle 9, and is formed with a plurality of air inlet openings 10 through the depending flange 8, through which unheated air will be drawn to be heated by the apparatus disposed within said casing or housing, hereinafter described. A plurality of locking screws 11 will be removably secured through the flange 8 and through the upper end of the casing or housing 1 for locking and securing the cover 7 in fixed position thereon.

A plurality of rubber cushioning and supporting feet 12 are attached by the fasteners 13 to the lower surface of the casing or housing bottom 2 for supporting the same in spaced relation above the floor 14.

Inverted L-shaped supporting brackets 15 are secured by means of the rivets or fasteners 16 to the inner walls of the casing or housing 1, and support the transversely extending spaced metal partition plates 17 and 18 which are disposed at the top and bottom of the sheet of insulating material 19, such as asbestos or the like. If desired, the partition plate 17 may be made from a sheet of infra-red transmitting glass (not shown) which will materially increase the efficiency of the air heating apparatus.

A plurality of electric sockets 20 are supported by the cover 7 and will support the infra-red lamp bulbs 21, and will be electrically connected with an outlet from a source of electric current supply (not shown). It will be understood that the infra-red lamp bulbs may be of tubular form if desired, depending upon the size and shape of the heater casing or housing.

A supporting bracket 22 will be mounted upon a rubber vibration dampening cushion 23 for attachment by bolts 24 to the lower inside wall of the casing or housing 1, and will also be provided with a rubber cushioning gasket 25 in its inner looped end, within which an electric motor 26 will be vertically mounted. Either a Sirrocco type fan 27 or a propeller type fan (not shown) will be connected with the shaft of the motor 26, and an air inlet elbow 37 will be connected with the fan casing to extend upwardly through the rubber cushioning washer 28 and through the partition separating the upper and lower compartments of the casing or housing, terminating in the flanged air inlet 38 disposed in the upper compartment of the casing or housing 1, while the discharge or outlet pipe 29 from the fan casing will be connected with a hot air outlet 30 formed in one side of the casing or housing 1, leading from the lower compartment of the said casing or housing to the outside thereof.

It will be further understood that any desired shock absorbing means may be employed for use with the air heating apparatus.

Furthermore, the air heating apparatus may be well adapted for heating refrigerator cars in which fresh fruits and vegetables are shipped over long distances. The heater also may be installed within the ice bunkers of refrigerator cars or in a compartment beneath floor of car with ducts in car floor leading from the compartment to interior of car.

In operation, the air heater will be connected with any suitable source of electric current supply, including storage battery and generator, the latter operated by a friction drive wheel contacting one of truck wheels of refrigerator car, or generator activated by wind driven propeller when the heating apparatus is used on farms having no city electric power, and the infra-red lamp bulbs and the electric fan operating motor will be energized. The air as it is drawn from outside of the casing or heater in through the air inlet openings 18 will be heated by the infra-red lamp bulbs 21, the action of said bulbs being to heat the air, and also to purify the same by killing the germs in the air. The clean heated air will then be discharged by the fan 27 to the hot air outlet 30 in the casing or housing 1 to efficiently and effectively heat the space or room in which the heating apparatus is located.

From the foregoing description, it will be seen that there has been devised and provided a highly efficient form of air heating apparatus which will be relatively inexpensive to manufacture and produce.

The heating apparatus may also be thermostatically controlled, thereby automatically shutting off the infra-red lamps and air circulating fan when the desired room temperature is reached.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. An air heating apparatus comprising a casing formed with a transversely extending partition separating the same into an upper and a lower apertured compartment, a heater disposed in said upper compartment, and a motor driven fan in said lower compartment, an air inlet extending through said partition and into said upper compartment being communicated with said fan and an outlet discharge duct communicated with said fan and the aperture in the lower compartment to conduct heated air through said casing.

2. An air heating apparatus comprising a casing formed with a transversely extending thermally insulating partition separating the same into lower and upper compartments, a detachable cover for said casing having a handle and formed with a depending peripheral flange having air inlets formed therethrough, electric sockets and infra-red lamp bulbs supported by said cover disposable in said upper compartment, and a motor driven fan in said lower compartment having an air inlet extending into said upper compartment and an outlet discharge extending within said lower compartment and through said casing.

3. An air heating apparatus comprising a casing formed with a transversely extending thermally insulating partition separating the same into upper and lower compartments, a detachable cover for said casing formed with a depending peripheral flange having air inlets formed therethrough, electric sockets and infra-red lamp bulbs supported by said cover disposable in said upper compartment, a motor driven fan in said lower compartment having an air inlet extending into said upper compartment and a discharge outlet extending through said casing, and a supporting bracket for said motor driven fan attached to said casing, and vibration dampening means interposed between the bracket and said casing.

4. The subject matter as claimed in claim 3, and said partition comprising spaced metal plates with an insulating filler disposed therebetween.

5. In an air heating apparatus, a casing having side walls, a cover and a bottom, a partition including a pair of spaced plates attached to each of said side walls, insulating material between said spaced plates, heater elements attached to said cover, whereby upon removal of said cover said heating elements are also removed, air inlets in said walls, an air inlet duct extending through said partition, a fan, a bracket attached to said fan, means for attaching said bracket to one of said walls, said air inlet duct being communicated with said fan, the said one of said walls being supplied with an aperture, and an outlet duct communicating with said fan and said aperture to conduct heated air from said casing.

6. A heating apparatus comprising a casing including a top and a bottom and walls, a partition attached to said walls defining an upper and lower chamber, a discharge opening in one of said walls adjacent the bottom of the casing and communicating with the lower compartment, inlet openings in said casing communicating with said upper compartment, heating means attached to said cover, an air impeller in said lower compartment, means for mounting said air impeller attached to said air impeller and to the one of said walls, a curved air inlet duct extending through said partition and communicating with said air impeller to receive heated air from a planar inlet stream spaced from the heating means.

ALFRED A. HAMER.

REFERENCES CITED

The following references are of record in the file of this patent:

UNITED STATES PATENTS

| Number | Name | Date |
|---|---|---|
| 1,754,232 | Fisher | Apr. 15, 1930 |
| 2,218,212 | Nassos | Oct. 15, 1940 |
| 2,372,832 | Jepson | Apr. 3, 1945 |
| 2,379,705 | Graves | July 3, 1945 |